S. J. MORGAN.
FRICTION SPEED CHANGING MECHANISM.
APPLICATION FILED DEC. 5, 1908.

953,634.

Patented Mar. 29, 1910.

3 SHEETS—SHEET 2.

Witnesses

Inventor
Saxton J. Morgan
By C. A. Snow & Co.
Attorneys

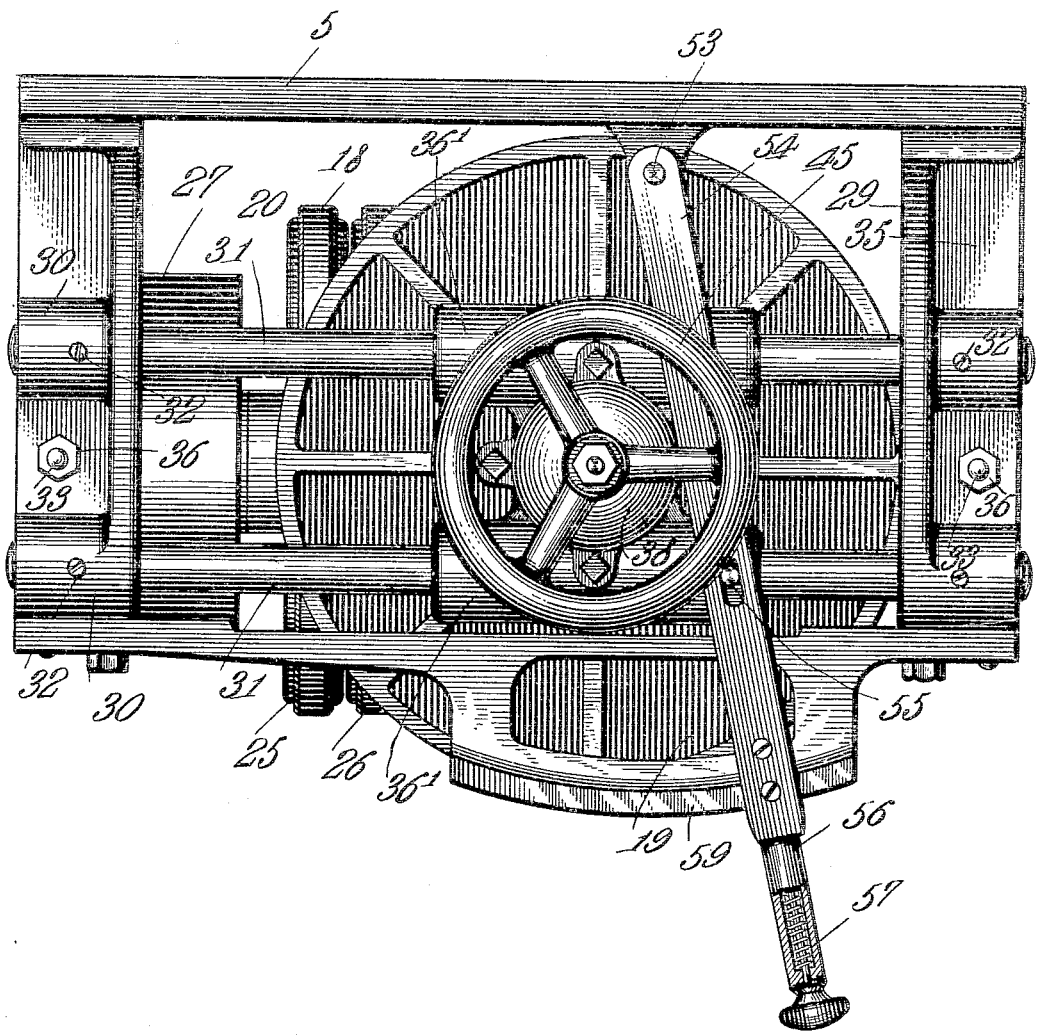

UNITED STATES PATENT OFFICE.

SAXTON JOSEPH MORGAN, OF ALBANY, WISCONSIN.

FRICTION SPEED-CHANGING MECHANISM.

953,634.

Specification of Letters Patent. Patented Mar. 29, 1910.

Application filed December 5, 1908. Serial No. 466,126.

*To all whom it may concern:*

Be it known that I, SAXTON J. MORGAN, a citizen of the United States, residing at Albany, in the county of Greene and State of Wisconsin, have invented a new and useful Friction Speed-Changing Mechanism, of which the following is a specification.

This invention relates to variable speed mechanism for drill presses, lathes and other machinery and has for its object to provide a friction power transmitting device in which the driven member may be rotated at a greater or lesser speed than the driving member.
A further object of the invention is to provide a differential friction wheel having a plurality of independent contact faces or treads for engagement with the transmission disk, thereby to prevent dragging or slipping of the treads on said transmission disk and thus reduce to a minimum wear and friction on the several parts.

A further object is to provide improved means for moving the transmission disk laterally with respect to the differential friction wheels to effect the different changes of speed, and means for varying the pressure exerted by the transmission disk on said friction wheel.
A still further object of the invention is generally to improve this class of devices so as to increase their utility, durability and efficiency.

Figure 1:
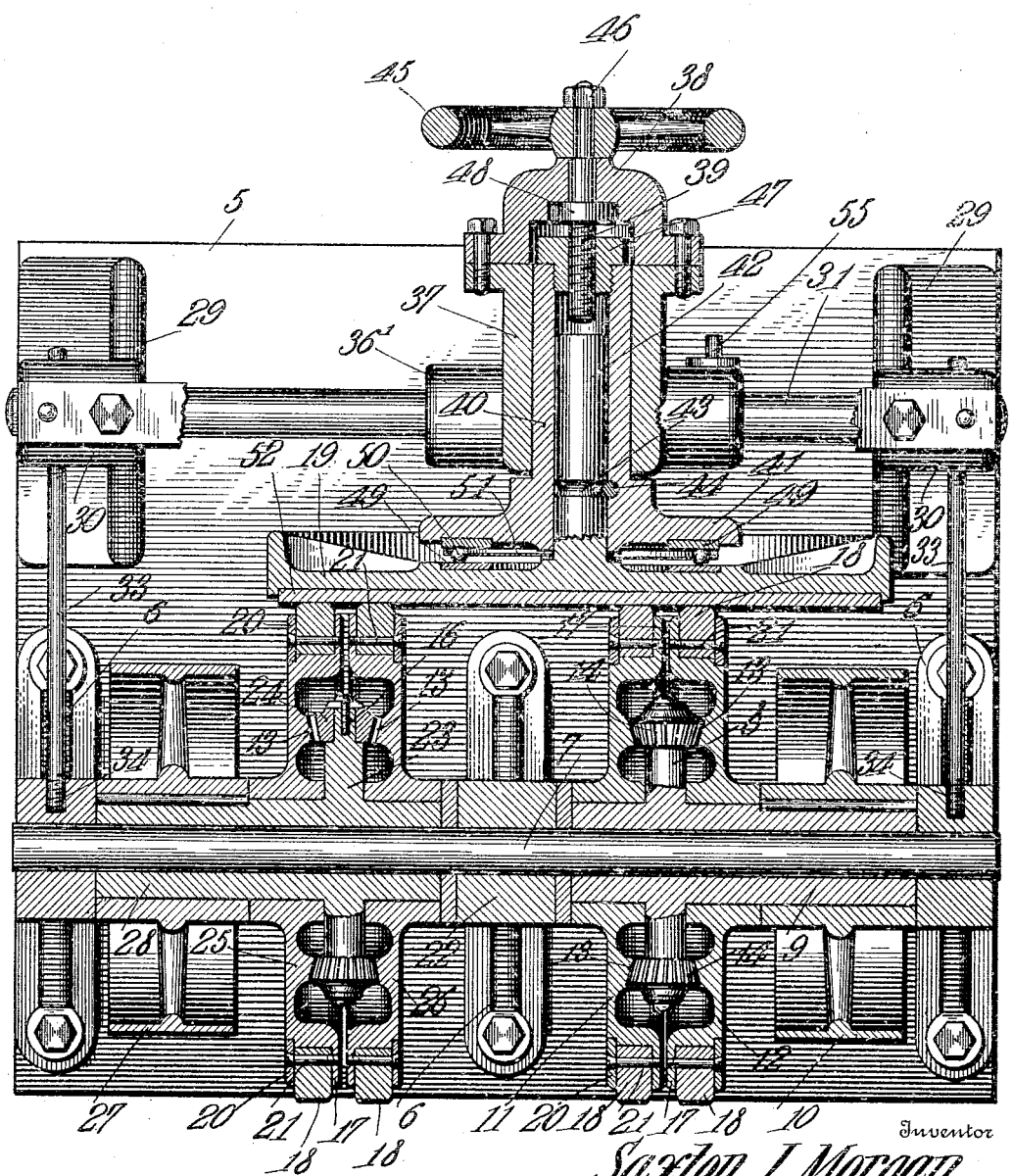
Figure 2:
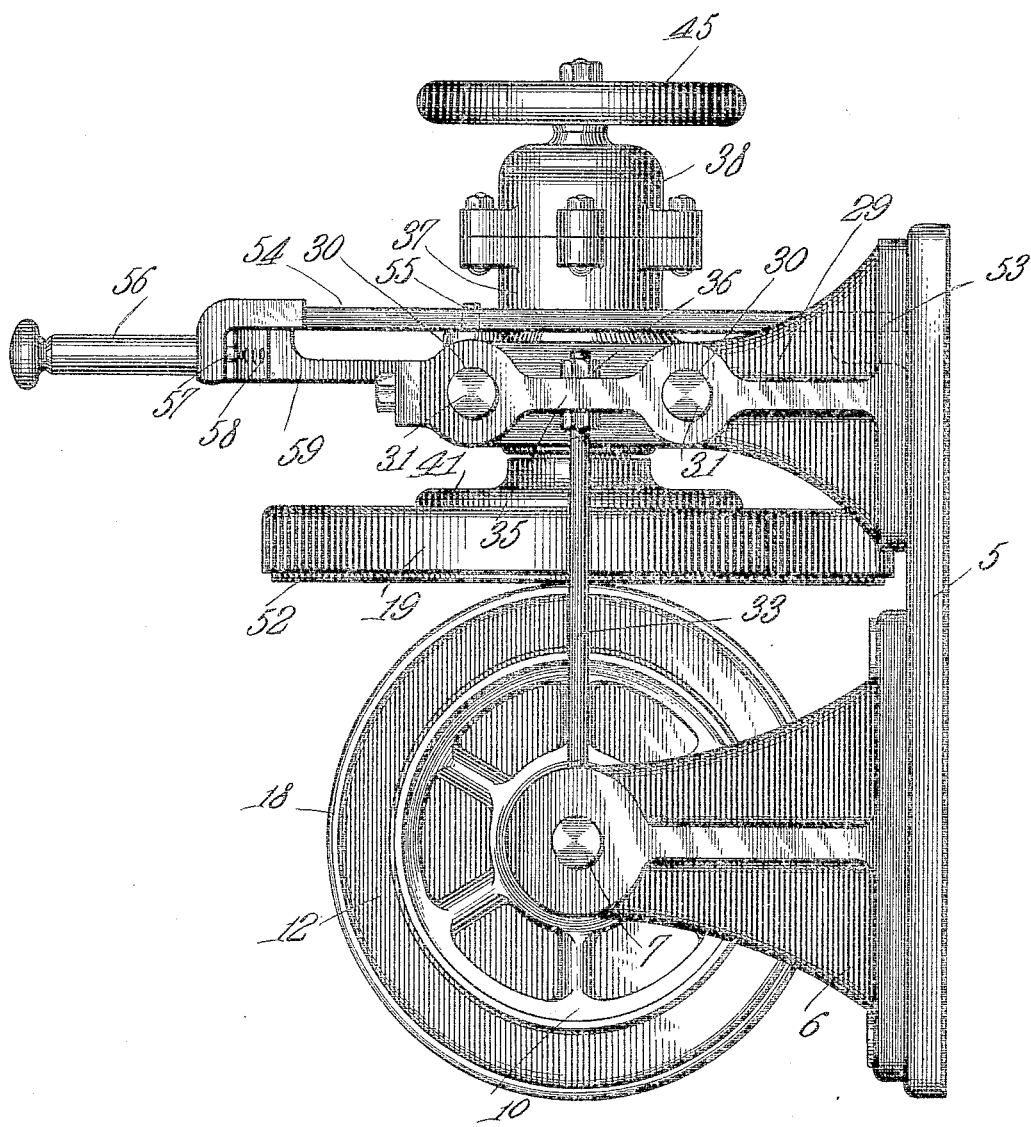

Further objects and advantages will appear in the following description, it being understood that various changes in form, proportions and minor details of construction may be resorted to within the scope of the appended claims.
In the accompanying drawings forming a part of this specification:—Figure 1 is a vertical sectional view of a variable speed power transmitting mechanism constructed in accordance with my invention. Fig. 2 is a side elevation of the same. Fig. 3 is a top plan view.

Similar numerals of reference indicate corresponding parts in all of the figures of the drawings.
The variable speed power transmitting mechanism forming the subject matter of the present invention is principally designed for use in connection with lathes, drill presses and the like, and in its preferred embodiment comprises a back plate or support 5 having spaced laterally extending brackets 6 secured thereto in which is mounted a stationary shaft 7.

Loosely mounted on the shaft 7 is a wheel 8 having a laterally extending hub 9 to which is keyed or otherwise rigidly secured a pulley 10, the latter being connected through the medium of a belt with a line shaft, whereby motion may be transmitted from the line shaft to the wheel 8.

Disposed on opposite sides of the wheel 8 and loosely mounted for rotation on the hub 9 thereof, are friction wheels 11 and 12 each provided with a beveled gear 13 meshing with corresponding pinions 14 mounted for rotation on suitable pins or studs 16 extending laterally from the peripheral edge of the wheel 8, as shown.

The peripheral edges of the friction wheels 11 and 12 are provided with flanges 17 forming seats for the reception of a tread 18, the latter being formed of rubber or other yieldable material and adapted to bear against the adjacent face of the transmission friction disk 19.

The yieldable tread surfaces 18 of the friction wheels or rings are supported in position on the peripheral edges of said wheels by removable plates 20, there being screws or similar fastening devices 21 extending through the plates 20 and flanges 17 for locking the several parts in assembled position.

Spaced from the wheel 8 by a collar 22 is a similar wheel 23 provided with pinions 24 which mesh with the beveled gears of a pair of friction disks or rings 25 and 26 similar in construction to the friction rings or disks 11 and 12, power being transmitted from the members 11 and 12 through the medium of the disk 19 to the friction wheels or rings 25 and 26 in the manner hereinafter described.

A pulley 27 is keyed or otherwise rigidly secured to the hub 28 of the wheel 23, which wheel may be connected by a belt with a lathe, drill press or other machine to be operated so that motion may be transmitted from the line shaft through the medium of the variable speed mechanism to the lathe.

Extending laterally from the back plate or support 5 and preferably disposed in vertical alinement with the brackets 6 are corresponding brackets 29 each provided in spaced openings or bearings 30 for the reception of longitudinally disposed guide rods 31, which latter are rigidly secured to the brackets 29 by clamping screws or similar fastening devices 32.

Interposed between the brackets 6 and 29 are vertically disposed reinforcing rods 33 each having one end thereof threaded in a socket 34 in the adjacent bracket 6 and its opposite end passing through an opening in the web 35 of the bracket 29 for engagement with clamping nuts 36, one of which preferably bears against each side of the web 35, as best shown, in Fig. 2 of the drawings.

Slidably mounted on the guide rods 31 is a pair of collars 36', and connecting said collars and movable with the same is a vertically disposed sleeve 37, the upper end of which is closed by a cap-piece 38, the latter being provided with an opening for the reception of an adjusting screw, indicated at 39.

Mounted for rotation within the sleeve 37 is a similar sleeve 40 having its lower end flanged laterally at 41 and positioned above the adjacent surface of the friction disk 19, which disk is provided with a vertically disposed stem 42, extending within the sleeve 40. The stem 42 is provided with an annular groove 43 for the reception of a key 44 so that the stem 42 is free to revolve within the sleeve 40 but is locked against vertical movement independently of the sleeve 40.

Secured to the upper unthreaded portion of the screw 39 is a hand wheel 45, one side of the hub of which bears against the cap-piece 38, while the other side thereof bears against the clamping nut 46.

The lower threaded end of the screw 39 extends through a correspondingly threaded bushing 47 arranged within the sleeve 40 and threaded for engagement with the latter so that by rotating the hand wheel 45, the friction transmission disk 19 may be raised or lowered, thereby to vary the pressure of said disk on the friction wheels.

It will here be noted that the screw 39 is free to rotate in the cap-piece but is locked from downward movement by the nut 46 and against upward movement by a collar or disk 48 seated in a recess in the cap 38, as best shown in Fig. 1 of the drawings.

The upper face of the friction transmission disk 19 and the lower face of the flange 41 are provided with hardened steel plates 49 between which are interposed anti-friction balls 50, the latter being held against accidental displacement by an annular retaining rim 51. The lower face of the disk 19 is provided with a recess for the reception of a friction plate 52 preferably formed of aluminum manganese so as to prevent excessive wear on the disk.

Pivotally mounted at 53 on the back plate or support 5 is a lever 54 having a pin and slot connection 55 with one of the sliding collars 36, said lever terminating in an overhanging hand-piece 56 in which is mounted for sliding movement a spring pressed locking pin 57, the active end of which is adapted to enter any one of a series of openings 58 formed in a segmental rack 59 secured in any suitable manner to the forward ends of the brackets 29 so that by operating the lever 54 the transmission disk 17 may be shifted laterally, thereby to increase or decrease the speed of the driven member.

Attention is here called to the fact that the pinions interposed between the friction wheels of each set form in effect a compensating gearing so that a plurality of contact surfaces are presented to the transmission disk and slipping or dragging of the tread surfaces of the friction wheels or rings over the aluminum face of the transmission disk is effectually obviated. It will also be seen that by manipulating the lever 54 the transmission disk 19 may be shifted until the friction gear 11 and 12 bears against said disk near the center of the latter, thus increasing the speed of the friction disks 25 and 26 and causing rapid rotation of the lathe, drill press or other machinery being operated.

When the transmission disk 19 is shifted laterally so that the tread surfaces of the friction wheels or rings 11 and 12 occupy a position near the peripheral edge of the disk 19, the friction wheels 25 and 26 will bear against the active face of the friction disk 19 near the center of the latter so that the speed of the lathe or other machinery will be correspondingly decreased.

From the foregoing description, it is thought that the construction and operation of the device will be readily understood by those skilled in the art and further description thereof is deemed unnecessary.

Having thus described the invention what is claimed is:—

1. In variable speed mechanism, a support, a stationary shaft carried by the support, a plurality of sets of spaced friction wheels loosely mounted and carried by the shaft, compensating gearing interposed between and operatively connected with the friction wheels of each set, spaced guide rods disposed above the stationary shaft, collars slidably mounted on the rods, and provided with a sleeve, a stem carried by the sleeve and provided with a friction transmission disk, and a lever operatively connected with the collars for adjusting the friction transmission disk laterally with respect to the friction wheels.

2. In variable speed mechanism, a support, a stationary shaft mounted on the support, a plurality of sets of spaced friction wheels loosely mounted and carried by the shaft, compensating gearing interposed between and operatively connected with the friction wheels of each set, spaced guide rods disposed above the stationary shaft, collars slidably mounted on the guide rods and connected by a vertically disposed sleeve, a friction transmission disk adapted to bear against the friction wheels and provided with a stem extending within the sleeve, a second sleeve, a bushing threaded in said second sleeve, a rod engaging the bushing for adjusting the second sleeve to vary the pressure exerted by the friction transmission disk on the friction wheels, and means for adjusting the transmission disk laterally with respect to the friction wheels.

3. In variable speed mechanism, a support having brackets secured thereto, a stationary shaft mounted in the brackets, a plurality of sets of spaced friction wheels loosely mounted and carried by the shaft, compensating gearing interposed between and operatively connected with the friction wheels of each set, brackets disposed above the stationary shaft and provided with spaced bearings, guide rods seated in said bearings, reinforcing rods connecting the shaft brackets and the guide rod brackets, collars slidably mounted on the guide rods and provided with a connecting sleeve, a friction transmission disk having a stem operating within the sleeve, means for adjusting the transmission disk to vary the pressure exerted by the latter on the friction wheels, and means for adjusting said transmission disk laterally of the friction wheels.

4. In variable speed mechanism, a stationary shaft, brackets disposed above the stationary shaft, spaced guide rods carried by the brackets, a plurality of sets of spaced friction wheels loosely mounted and carried by the shaft, pinions interposed between each set of friction wheels and operatively connected therewith, collars mounted on the guide rods, a sleeve carried by the collars, a transmission disk operating within the sleeve and adapted to bear against the friction wheel, an operating lever having a pin and slot connection with one of the collars for adjusting the transmission disk relatively to the friction wheel, and means for adjusting the transmission disk vertically of the support.

5. In variable speed mechanism, a stationary shaft, a plurality of sets of spaced friction wheels loosely mounted and carried by the shaft, pinions interposed between the friction wheels of each set and operatively connected therewith, brackets disposed above the stationary shaft, spaced guide rods carried by the brackets, a sleeve slidably mounted on the guide rods, a friction transmission disk operating within the sleeve, a segmental plate secured to the brackets and provided with a series of openings, a lever operatively connected with the sleeve for adjusting the transmission friction disk laterally of the friction wheels, and a spring pressed pin carried by the lever and arranged to enter the openings in the segmental plate for locking the lever in adjusted position.

6. In variable speed mechanism, a stationary shaft, a plurality of sets of spaced friction wheels loosely mounted and carried by the shaft and each provided with a peripheral seat, a yieldable tread surface engaging the seat of each friction wheel, pinions interposed between the friction wheels of each set and operatively connected therewith, a friction transmission disk for engagement with the tread surfaces of the friction disks, means for adjusting the transmission disk vertically of the shaft, and means for moving said transmission disk laterally with respect to the friction wheels.

7. In variable speed mechanism, a stationary shaft, spaced transmission wheels loosely mounted and carried by the shaft and provided with laterally extending hubs, a pulley keyed to the hub of each transmission wheel, spaced friction wheels loosely mounted on the hubs of each transmission wheel and provided with yieldable treads, a guide rod disposed above and arranged parallel with the shaft, a sleeve mounted on said rod, a friction transmission disk carried by the sleeve and arranged to bear against the treads of the friction wheels, and means for adjusting the transmission disk laterally of said friction wheels.

In testimony that I claim the foregoing as my own, I have hereto affixed my signature in the presence of two witnesses.

SAXTON JOSEPH MORGAN.

Witnesses:
H. M. WHITCOMB,
E. W. BOYLES.